United States Patent
Konada (10) Patent No.: US 10,282,270 B2
(45) Date of Patent: May 7, 2019

(54) HYBRID SIGNAL DIAGNOSTIC METHOD, ID MODULE AND PROCESS CONTROL SYSTEM USING THE HYBRID SIGNAL

(71) Applicant: YOKOGAWA ELECTRIC CORPORATION, Tokyo (JP)

(72) Inventor: Soichiro Konada, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 274 days.

(21) Appl. No.: 15/228,005

(22) Filed: Aug. 4, 2016

(65) Prior Publication Data
US 2017/0046239 A1    Feb. 16, 2017

(30) Foreign Application Priority Data
Aug. 14, 2015 (JP) ................. 2015-160165

(51) Int. Cl.
G06F 13/10 (2006.01)
G06F 11/30 (2006.01)

(52) U.S. Cl.
CPC ...... *G06F 11/3051* (2013.01); *G06F 11/3041* (2013.01); *G06F 13/102* (2013.01)

(58) Field of Classification Search
None
See application file for complete search history.

(56) References Cited

U.S. PATENT DOCUMENTS

| 8,392,626 | B2 | 3/2013 | Wormmeester et al. |
| 2009/0097415 | A1* | 4/2009 | Shepard ............ H04W 40/24 370/254 |
| 2014/0044136 | A1 | 2/2014 | Sin |
| 2014/0233371 | A1* | 8/2014 | Endou ............... H04L 41/04 370/220 |
| 2015/0120972 | A1 | 4/2015 | Tanimura et al. |

FOREIGN PATENT DOCUMENTS

| CN | 101625670 A | 1/2010 |
| JP | H10-149495 A | 6/1998 |
| JP | 2008-146362 A | 6/2008 |
| JP | 2011-233088 A | 11/2011 |
| JP | 2014-38617 A | 2/2014 |
| JP | 2015-87975 A | 5/2015 |

* cited by examiner

*Primary Examiner* — Scott C Sun
(74) *Attorney, Agent, or Firm* — Sughrue Mion, PLLC (57) ABSTRACT

A diagnostic method of diagnosing a type of a field device, includes: setting a plurality of connection units included in an I/O module to be in a state of being capable of inputting or outputting a hybrid signal which is an analog signal having a digital signal superimposed thereon, the connection units being connected to the field device and capable of inputting the hybrid signal, outputting the hybrid signal, inputting a digital signal, and outputting a digital signal; and diagnosing the type of the field device which is connected to the connection units of the I/O module, based on the digital signal included in the hybrid signal obtained through the connection units.

5 Claims, 5 Drawing Sheets

HYBRID SIGNAL DIAGNOSTIC METHOD, ID MODULE AND PROCESS CONTROL SYSTEM USING THE HYBRID SIGNAL

BACKGROUND OF THE INVENTION

Field of the Invention

The present invention relates to a diagnostic method, an ID module, and a process control system. More specifically, the present invention relates to a method of diagnosing the type of field device in a process control system that controls a plurality of non-intelligent field devices, an ID module which is connected to the field device, and a process control system.

Priority is claimed on Japanese Patent Application No. 2015-160165, filed on Aug. 14, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

Hitherto, in plants, factories and the like, process control systems that control various state quantities (such as, for example, pressure, temperature, flow rate) in industrial processes have been constructed, and a high level of automatic operation has been realized. The process control systems are provided with field devices (measuring instruments or operating instruments) called a plurality of field devices. Each of the field devices is connected to a controller through an I/O port (I/O circuit or input and output circuit), and the controller controls the operating instrument (for example, actuator) in accordance with measurement results of the measuring instrument (for example, sensor). Thereby, various state quantities are controlled.

There are various kinds (signal types) of field devices which are used in the process control systems in accordance with an object to be measured and an object to be operated, and there are also various types of signals which are input and output. For example, there are a type for inputting and outputting an analog signal of "4 to 20 mA", a type for inputting and outputting a digital signal of "24 V", a type for inputting and outputting a contact signal, a type for outputting a thermocouple signal, and the like. Therefore, in the process control systems of the related art, an I/O circuit (input and output circuit) corresponding to the field device is provided for each field device.

The number of field devices provided in the process control system increases or decreases in accordance with the scale of a plant or the like. The number of field devices may exceed ten thousand in a large-scale plant or the like, and it takes too much time and labor for wiring the field devices in the entire process control system. Therefore, a reduction in the time and labor of wiring leads to a large reduction in costs in the entire process control system.

The following Specification of U.S. Pat. No. 8,392,626 discloses a circuit (hereinafter, referred to as a universal circuit) capable of connecting field devices that input and output the analog signal or field devices that input and output the digital signal which account for a large majority of field devices. Specifically, the universal circuit disclosed in the Specification of U.S. Pat. No. 8,392,626 is a circuit capable of inputting (A/I) the analog input signal, outputting (A/O) the analog output signal, inputting (D/I) the digital input signal, or outputting (D/O) the digital output signal. An I/O module (input and output module) including a plurality of universal circuits has a plurality of channels. Since a field device can be connected to each of the channels of the I/O module, one I/O module can connect to multiple types of field devices.

Initially, wiring (marshaling) between the field device and each channel of the I/O module is performed. After the wiring is completed, an I/O mode (any of the input (A/I) of the analog input signal, the output (A/O) of the analog output signal, the input (D/I) of the digital input signal, or the output (D/O) of the digital output signal) of each channel of the I/O module is configured in accordance with the type of field device. Thereby, wiring (marshaling) between a terminal block to which the field device is wired and connected and the I/O module is not required, and thus the efficiency of field work such as wiring work is achieved. In addition, as compared with the providing of an I/O circuit corresponding to the type of field device for each channel, a reduction in costs can be expected by connecting multiple types of field devices to a plurality of channels of one I/O module.

The following Japanese Unexamined Patent Application, First Publication No. 2015-87975 discloses an I/O module capable of connecting more types of field devices than ever before. Specifically, the I/O module disclosed in Japanese Unexamined Patent Application, First Publication No. 2015-87975 includes a base plate having a plurality of connection terminals to which a plurality of field devices are electrically connected, a plurality of universal circuits which are provided in the base plate so as to correspond to the plurality of connection terminals, and an option module which is detachably provided in the base plate. Since any one connection terminal of the plurality of connection terminals provided in the base plate and a universal circuit corresponding to this connection terminal are connected to each other by the option module mounted on the base plate, and a field device connected to the connection terminal and the universal circuit are electrically connected to each other by a first circuit provided in the mounted option module, it is possible to connect more types of field devices than ever before.

A plurality of field devices are centrally managed in an upper layer device (device management terminal) through a network. The device management terminal manages the type of each field device and the arrangement location (wiring) thereof, and monitors whether abnormality is present or not. For this reason, the device management terminal is required to ascertain which field device is connected to each I/O port. Consequently, the device management terminal has a database that stores information about the type of field device which is connected to each I/O port. In a plant, the arrangement of field devices is often changed, and the database included in the device management terminal is required to be updated whenever the location (wiring) at which the field devices are arranged is changed.

In recent years, an intelligent field device having a function of allowing the field device itself to transmit information pertaining to itself through a network has been widely used. The information which is transmitted by this field device is matched with information of the I/O module, and thus it is possible to obtain information pertaining to wiring. In a case where the location (wiring) at which the intelligent field devices are arranged is changed, the intelligent field device itself transmits information pertaining to its own type or the arrangement location (wiring) thereof through a network, and thus the device management terminal can update a database by receiving the information. Thus, in a case where the intelligent field device is connected, it is possible to improve the efficiency of connection work and confirmation work to and for the I/O port.

However, the proportion of the intelligent field device to a total of field devices is approximately 50% as of 2015, and a non-intelligent field device has been widely used as of now. The non-intelligent field device refers to a field device which has no communication function and only deals with a signal pertaining to control. The non-intelligent field device does not transmit information pertaining to its own type or the arrangement location (wiring) thereof. For this reason, in a case where the non-intelligent field device is connected, which type of non-intelligent field device is connected to each I/O port is not able to be electrically confirmed on the I/O port side, and thus the confirmation has no choice but to be based on the visual confirmation of a worker in the field.

Depending on the scale of a plant, approximately 5,000 to 10,000 field devices are installed in the plant. In a case where the location (wiring) at which the non-intelligent field devices are arranged is changed, a worker needs to update a database included in the device management terminal, and thus the efficiency of work pertaining to wiring drops.

SUMMARY OF THE INVENTION

The present invention provides a diagnostic method capable of electrically confirming the type of field device or the type of signal on an I/O port side in a process control system in which a large number of non-intelligent field devices are arranged, an ID module, and a process control system.

According to an aspect of the present invention, there is provided a method of diagnosing a type of field device (11, 11a, 11b), including: a step of setting a plurality of connection units (P) of an I/O module (12) to be in a state of being capable of inputting or outputting a hybrid signal which is an analog signal having a digital signal superimposed thereon, the I/O module including the connection units connected to the field device and are capable of inputting the hybrid signal, outputting the hybrid signal, inputting a digital signal, and outputting a digital signal; and a step of diagnosing the type of field device which is connected to the connection units of the I/O module, on the basis of the digital signal included in the hybrid signal obtained through the connection units.

In addition, the diagnostic method according to the aspect of the present invention may further include a step of setting the connection units connected to the field device to be in a state of being capable of any one of the input of the hybrid signal, the output of the hybrid signal, the input of a digital signal, and the output of a digital signal, in accordance with diagnosis results of the type of field device.

In addition, in the diagnostic method according to the aspect of the present invention, the diagnosis of the type of field device and the setting of the connection units may be performed by a controller, communicably connected to the I/O module, which controls the field device, or a portable terminal which is connected to the I/O module.

In addition, in the diagnostic method according to the aspect of the present invention, the field device may include a first field device (11a) which is capable of communicating the hybrid signal, and a second field device (11b) which is incapable of communicating the hybrid signal, and an ID module (10) that provides at least second field device identification information may be connected in parallel to the second field device.

In addition, the diagnostic method according to the aspect of the present invention may further include a step of writing at least the identification information of the second field device connected to the ID module in a memory (25) of the ID module.

In addition, the diagnostic method according to the aspect of the present invention may further include a step of causing the ID module to update the information written in the memory of the ID module.

In addition, the diagnostic method according to the aspect of the present invention may further include a step of acquiring the information written in the memory of the ID module from a database (16).

According to another aspect of the present invention, there is provided an ID module that provides at least field device identification information (11, 11a, 11b), including: a power supply circuit (26) that obtains a power supply required for an operation from a wiring (C1) to which the field device is connected; a memory (25) that stores the identification information; and a communication unit (23) that superimposes a digital signal indicating the identification information stored in the memory on an analog signal through the wiring, and transmits the superimposed signal.

In addition, in the ID module according to the aspect of the present invention, in a case where the communication unit receives a request for transmission of the identification information transmitted in a state of being superimposed on the analog signal through the wiring, the communication unit may transmit the digital signal indicating the identification information.

In addition, the ID module according to the aspect of the present invention may further include a voltage detection circuit (27) that detects a voltage of the wiring, and the communication unit may superimpose a digital signal indicating detection results of the voltage detection circuit on the analog signal through the wiring, and transmit the superimposed signal.

In addition, the ID module according to the aspect of the present invention may further include a counting unit (28) that obtains the number of times of operation of the field device on the basis of the detection results of the voltage detection circuit, and the communication unit may superimpose a digital signal indicating the number of times of operation obtained by the counting unit on the analog signal through the wiring, and transmit the superimposed signal.

In addition, the ID module according to the aspect of the present invention may further include a terminal unit (21) which is connected to the wiring, the power supply circuit may be connected to the terminal unit, and the communication unit may be connected to the terminal unit with a capacitor (22) interposed therebetween.

According to still another aspect of the present invention, a process control system (1) that controls an industrial process, includes: a plurality of field devices (11, 11a, 11b); an I/O module (12) including a plurality of connection units (P) which are connected to the field devices and are capable of inputting a hybrid signal which is an analog signal having a digital signal superimposed thereon, outputting the hybrid signal, inputting a digital signal, and outputting a digital signal; the ID module (10) which is connected in parallel to the field devices; and an upper layer device (14, 15, 17), communicably connected to the I/O module, which controls the I/O module and diagnoses a type of field device connected to the connection units of the I/O module.

According to the process control system of each aspect of the present invention, in construction during the setting up or enlargement of a plant, it is possible to electrically confirm the device ID, status information and the like of the field device on the I/O port side with respect to a non-intelligent field device. Thereby, the upper layer device (instrumentation room) side can confirm the type of each field device or the type of signal and a line state, and ascertain a status (state). Therefore, it is possible to reduce such a mistake as access to different field devices during maintenance or the like.

In an automatic device diagnosis used in a plant, various types of field devices are diagnosed using digital communication. According to the process control system of each aspect of the present invention, since the non-intelligent field device can be dealt with similarly to an intelligent field device, it is possible to increase the number of field devices capable of a device diagnosis, and to contribute to the safe operation of a plant and a rapid analysis during a failure.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE INVENTION

Hereinafter, reference will be made to the accompanying drawings to describe the details of a method of diagnosing the type of field device in a process control system according to an embodiment of the present invention, an ID module which is connected to the field device, and a process control system.

Figure 1:
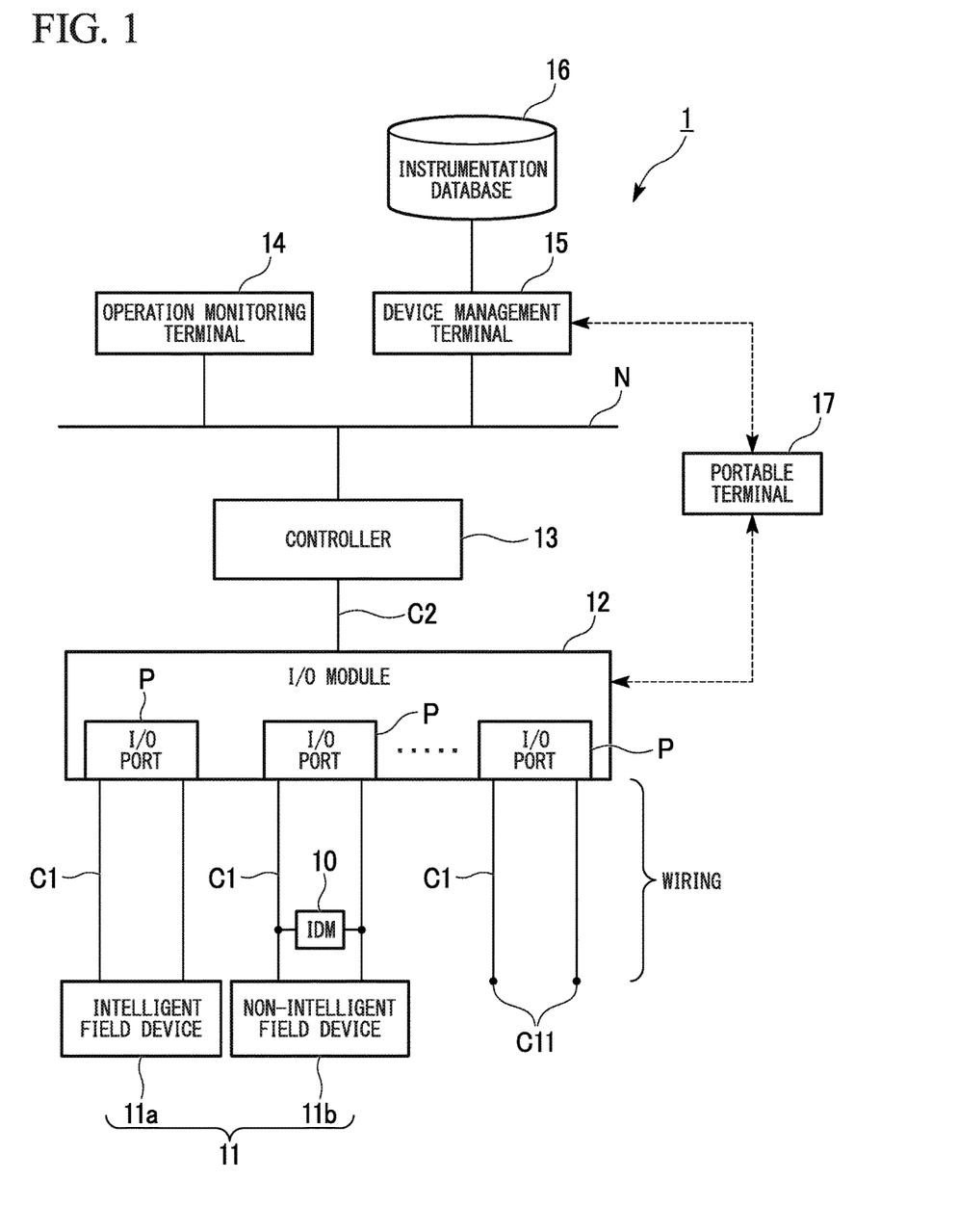
FIG. 1 is a block diagram showing the entire configuration of a process control system according to an embodiment of the present invention.

FIG. 1 is a block diagram showing the entire configuration of a process control system according to an embodiment of the present invention. As shown in FIG. 1, a process control system 1 includes an ID module (device specifying module or device identifying module) 10, field devices 11, an I/O module (input and output module) 12, a controller 13, an operation monitoring terminal 14, a device management terminal 15, and an instrumentation database (database) 16. An industrial process which is realized in a plant (not shown) is controlled by the controller 13 controlling the field devices 11 in accordance with instructions or the like from the operation monitoring terminal 14.

The field devices 11 and the I/O module 12 are connected to each other through transmission lines C1. Specifically, the I/O module 12 includes a plurality of I/O ports (connection units) P, and a transmission path C1 constituted by two wirings comes from each of the I/O ports P. Each of the field devices 11 is connected to a wiring end C11 of the transmission path C1.

The field device 11 is a measuring instrument (for example, sensor device such as a flowmeter or a temperature sensor), an operating instrument (for example, valve device such as a flow rate control valve or an on-off valve, or actuator device such as a fan or a motor), or a device which is installed in the fields of other plants. In addition, the field device 11 includes a device that outputs analog data (analog signal), a device that inputs analog data (analog signal), a device that outputs digital data (digital signal), and a device that inputs digital data (digital signal).

The field device 11 may be any of an intelligent field device (first field device) 11a and a non-intelligent field device (second field device) 11b. The intelligent field device 11a is a field device capable of communicating a hybrid signal which is an analog signal having a digital signal superimposed thereon. The non-intelligent field device 11b is a field device which is not capable of communicating the hybrid signal.

The I/O port P can input the hybrid signal, output the hybrid signal, input a digital signal, and output a digital signal to and from the field device 11. Whether the I/O port P is caused to perform any of the input and output is set on the I/O module 12 side under the instructions from the controller 13 or a portable terminal 17.

The I/O module 12 and the controller 13 are connected to each other through a cable C2. The controller 13, the operation monitoring terminal 14 the device management terminal (upper layer device) 15, and the instrumentation database 16 are connected to a control network N. The control network N is, for example, a network that connects the field of a plant to a monitoring room thereof.

The I/O module 12 is provided between the field device 11 and the controller 13, is configured such that a plurality of field devices 11 can be connected thereto, and processes a signal which is input and output between each of the connected field devices 11 and the controller 13. For example, the module performs a process of converting a signal which is obtained from the field device 11 into a signal capable of being received by the controller 13. The I/O module 12 can also be referred to a module that connects the plurality of field devices 11 to the controller 13, and performs a relay between a signal which is input and output to and from each of the field devices 11 and a signal which is input and output to and from the controller 13.

The controller 13 controls the field devices 11 by performing communication with the field devices 11 in accordance with the instructions or the like from the operation monitoring terminal 14. Specifically, the controller 13 acquires a process value measured by a measuring instrument, for example, the field device 11 such as a sensor device, and arithmetically operates and transmits the amount of operation of an operating instrument, for example, the field device 11 such as a valve device, to thereby control an operating instrument, for example, the field device 11 such as a valve device.

The operation monitoring terminal 14 is, for example, a terminal which is operated by an operator of a plant and is used for monitoring a process. Specifically, the operation monitoring terminal 14 acquires input and output data of the field device 11 from the controller 13 to transmit the behavior of the field device 11 or the controller 13 constituting the process control system 1 to an operator, and controls the controller 13 on the basis of the operator's instructions.

The device management terminal 15 creates information to be set in the field device 11, the I/O module 12, and the controller 13 on the basis of design information stored in the instrumentation database 16 (design information of a plant inclusive of the process control system 1). The information created by the device management terminal 15 includes an I/O list (setting information) which is information related to the input and output between the field device 11 and the I/O port P.

The instrumentation database 16 stores the design information or device information referred to in the device management terminal 15. Meanwhile, the instrumentation database 16 may be located inside the device management terminal 15. In addition, the instrumentation database 16 may be an external database connected to the device management terminal 15 or the like through a (wired or wireless) network. In addition, the instrumentation database 16 may be a database included in the portable terminal 17.

The portable terminal 17 is a portable terminal such as a notebook PC brought into the installation location of the I/O module 12, and is connected to the I/O module 12 in a wireless or wired manner. The process control system 1 is constructed by performing various settings for the I/O module 12 and the field device 11 using the portable terminal 17. By using the portable terminal 17, even in a state where the controller 13 is not connected to the I/O module 12 the setting or adjustment for the field device 11 and the I/O module 12, a connection test between the field device 11 and the I/O module 12, and the like can be performed.

The ID module 10 is connected to two wirings of the transmission path C1 between the I/O port P and the field device 11, and provides identification information for identifying at least the connected field device 11 so as to be parallel with the field device 11. Meanwhile, in the present embodiment, as shown in FIG. 1, the ID module 10 is connected only between the I/O port P and the non-intelligent field device 11b, and the ID module 10 is not connected between the I/O port P and the intelligent field device 11a, but the ID module 10 may be connected between the I/O port P and the intelligent field device 11a.

Figure 2:
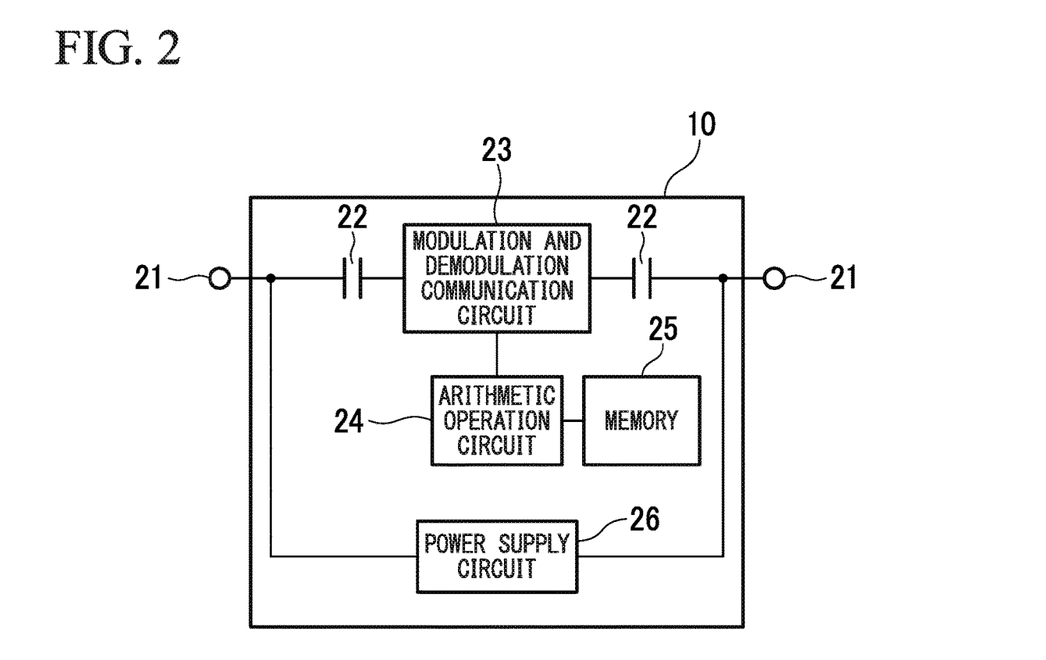
FIG. 2 is a circuit diagram showing a configuration example of an ID module in the process control system according to the embodiment of the present invention.

Next, the configuration of the ID module 10 will be described. FIG. 2 is a circuit diagram showing a configuration example of the ID module in the process control system according to the embodiment of the present invention. The ID module 10 includes terminal units 21, capacitors 22, a modulation and demodulation communication circuit (communication unit) 23, an arithmetic operation circuit 24, a memory 25, and a power supply circuit 26.

The terminal unit 21 is a terminal for connecting the ID module 10 to a wiring between the I/O port P and the non-intelligent field device 11b. The ID module 10 is connected to a wiring in parallel with the non-intelligent field device 11b.

The modulation and demodulation communication circuit 23 is connected to the terminal unit 21 with the capacitor 22 for direct-current component cutting interposed therebetween. The modulation and demodulation communication circuit 23 modulates and demodulates electrical signals which are received/transmitted through the transmission path C1 and the terminal unit 21. Specifically, in a case where the modulation and demodulation communication circuit 23 receives a request for transmission of identification information which is superimposed on an analog signal through a wiring and is transmitted from an upper layer device, the circuit superimposes a digital signal, indicating the identification information of the non-intelligent field device 11b which is stored in the memory 25, on an analog signal through a wiring, and transmits the superimposed signal. Meanwhile, as an example of the modulation and demodulation communication circuit 23, a HART (Registered Trademark) communication circuit having a HART (Registered Trademark) communication function, that is, capable of performing communication based on a HART (Registered Trademark) communication specification may be used.

The arithmetic operation circuit 24 performs an arithmetic operation on the basis of information (command) demodulated by the modulation and demodulation communication circuit 23. In addition, the arithmetic operation circuit 24 transmits an arithmetic operation result to a wiring through the modulation and demodulation communication circuit 23 and the terminal unit 21.

The memory 25 is connected to the arithmetic operation circuit 24. The memory 25 stores identification information such as the signal type, device name (device ID), serial number, tag name, and other status information of the corresponding non-intelligent field device 11b.

The power supply circuit 26 converts a direct-current voltage obtained from the terminal unit 21 into power required for an operation of an internal circuit such as the modulation and demodulation communication circuit 23, the arithmetic operation circuit 24, or the memory 25, and supplies the converted power to the internal circuit through a (not shown) wiring.

Figure 3:
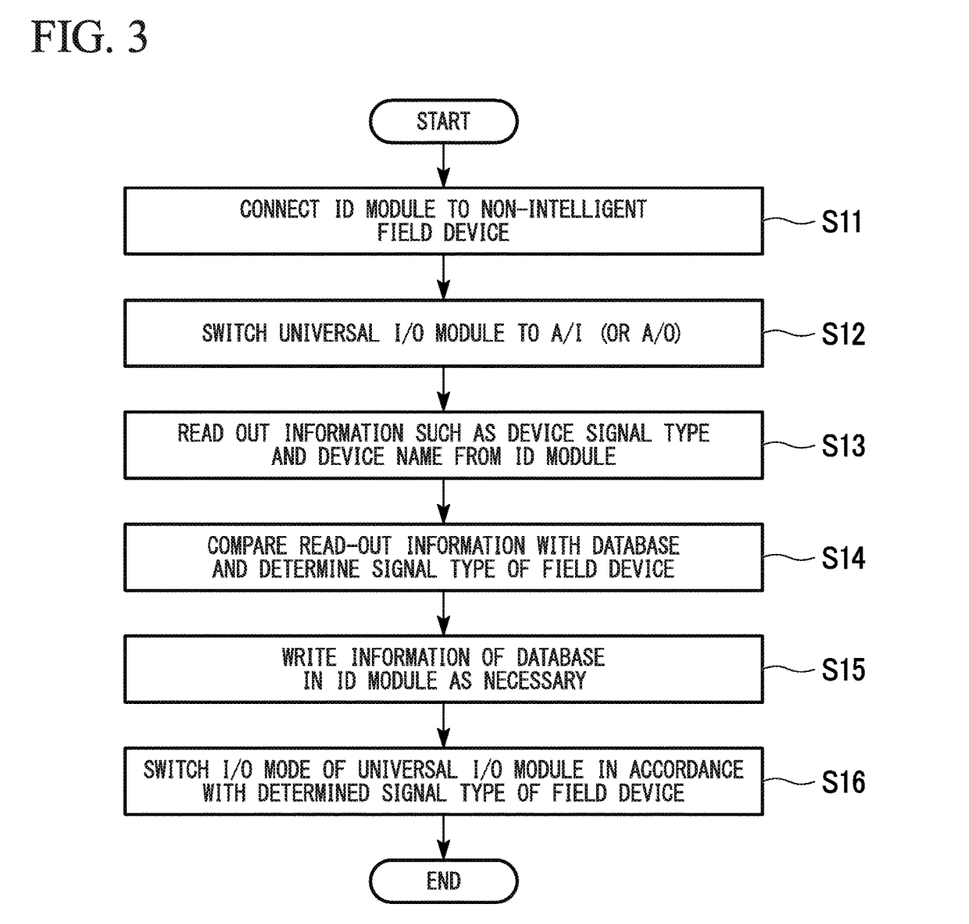
FIG. 3 is a flow diagram showing a flow for determining the type of field device in the process control system according to the embodiment of the present invention.

Next, a flow showing the signal type of the non-intelligent field device in the process control system will be described. FIG. 3 is a flow diagram showing a flow showing the signal type of the field device in the process control system according to the embodiment of the present invention.

(Step S11)

After a wiring to the field device 11 is performed, the ID module 10 is connected in close proximity to the non-intelligent field device 11b. Meanwhile, the ID module 10 may be connected to the non-intelligent field device 11b in advance in a factory or the like. The memory 25 of the ID module 10 is required to store at least identification information including information in which the signal type of the corresponding non-intelligent field device 11b can be determined. The memory 25 of the ID module 10 may further store the device name, serial number, tag name, and the like of the non-intelligent field device 11b. Meanwhile, at the time of the factory shipment of the non-intelligent field device 11b, shipment may be performed in a state where the ID module 10 having information (such as the device name and the serial number) of the non-intelligent field device 11b written therein is installed in advance.

(Step S12)

The device management terminal 15 switches an I/O mode of the I/O port P to an A/I mode (or A/O mode), regardless of the signal type of the field device 11 which is connected. Here, the A/I mode is an analog input mode, and is a mode for performing an A/I function of loading measurement data of an analog value from a field device (such as a measuring instrument) that outputs analog data (analog signal) to the I/O port P. The A/O mode is an analog output mode, and is a mode for performing an A/O function of outputting data of an analog value from the I/O port P to a field device (such as an operating instrument) that inputs analog data (analog signal).

That is, in step S12, the I/O port P is set in a state where an analog signal which is an analog signal having a digital signal superimposed thereon can be input or output. Meanwhile, the switching of the I/O modes of the I/O port P may be configured to be automatically performed by the I/O port P. The A/I function of performing the A/I mode of the I/O port P and the A/O function of performing the A/O mode are required to include a modulation and demodulation communication function (for example, HART (Registered Trademark) communication function) of using modulated and demodulated signals.

(Step S13)

The device management terminal 15 uses modulated and demodulated signals through the I/O module 12, and reads out identification information such as the signal type, device name (device ID), serial number, tag name, and other status information of the corresponding non-intelligent field device 11b which are recorded in the memory 25 of the ID module 10. Specifically, the modulation and demodulation communication circuit 23 of the ID module 10 transmits a digital signal indicating the identification information stored in the memory 25 as the hybrid signal superimposed on an analog signal through a wiring, and the device management terminal 15 reads out the identification information from the hybrid signal.

(Step S14)

The device management terminal 15 compares the identification information read out from the memory 25 of the ID module 10 with information stored in the instrumentation database 16, and diagnoses the signal type of the non-intelligent field device 11b. As described above, the instrumentation database 16 may be located inside the device management terminal 15. In addition, the instrumentation database 16 may be an external database connected to the device management terminal 15 or the like through a (wired or wireless) network. In addition, the instrumentation database 16 may be a database included in the portable terminal 17 such as a notebook PC brought into the installation location of the I/O module 12.

(Step S15)

The device management terminal 15 may write the identification information of the non-intelligent field device 11b stored in the instrumentation database 16, as necessary, in the memory 25 of the ID module 10. For example, in a case where only the device name and serial number of the non-intelligent field device 11b are initially stored in the memory 25 of the ID module 10, the device management terminal 15 may write the tag name of the non-intelligent field device 11b, turned out by referring to the instrumentation database 16, in the memory 25 of the ID module 10. Which process device the non-intelligent field device 11b is installed in inclusive of position information or the like of the non-intelligent field device 11b may be written in writing information in the memory 25 of the ID module 10. As the position information of the non-intelligent field device 11b, GPS information may be used.

Meanwhile, the ID module 10 may have a function of updating the information written in the memory 25. In addition, the instrumentation database 16 may be configured to be capable of acquiring the information written in the memory 25 of the ID module 10.

(Step S16)

The device management terminal 15 switches the I/O mode of the I/O port P in accordance with the signal type of the non-intelligent field device 11b determined in step S4. That is, the device management terminal 15 sets the I/O port P, having the non-intelligent field device 11b connected thereto, to be in a state of being capable of any one of the input of the hybrid signal, the output of the hybrid signal, the input of a digital signal, and the output of a digital signal, in accordance with diagnosis results of the signal type of the non-intelligent field device 11b.

Based on the above flow of steps S11 to S16, the signal type of the non-intelligent field device is determined in the process control system according to the embodiment of the present invention.

Meanwhile, in the above description, a description has been given of a case where the device management terminal 15 performs steps S12 to S16, but the operation monitoring terminal 14, the controller 13, or the portable terminal 17 may perform steps S12 to S16 described above, instead of the device management terminal 15.

In the above-described embodiment, a case has been described in which the switching of the I/O mode of the I/O port P, the reading of the memory 25 of the ID module 10, the determination of the signal type of the field device 11, and the like are performed by the device management terminal 15 through the controller 13. However, the switching of the I/O mode of the I/O port P, the reading of the memory 25 of the ID module 10, the determination of the signal type of the field device 11, and the like may be performed from the portable terminal 17 such as a notebook PC connected to the I/O module 12 without going through the controller 13.

Figure 4:
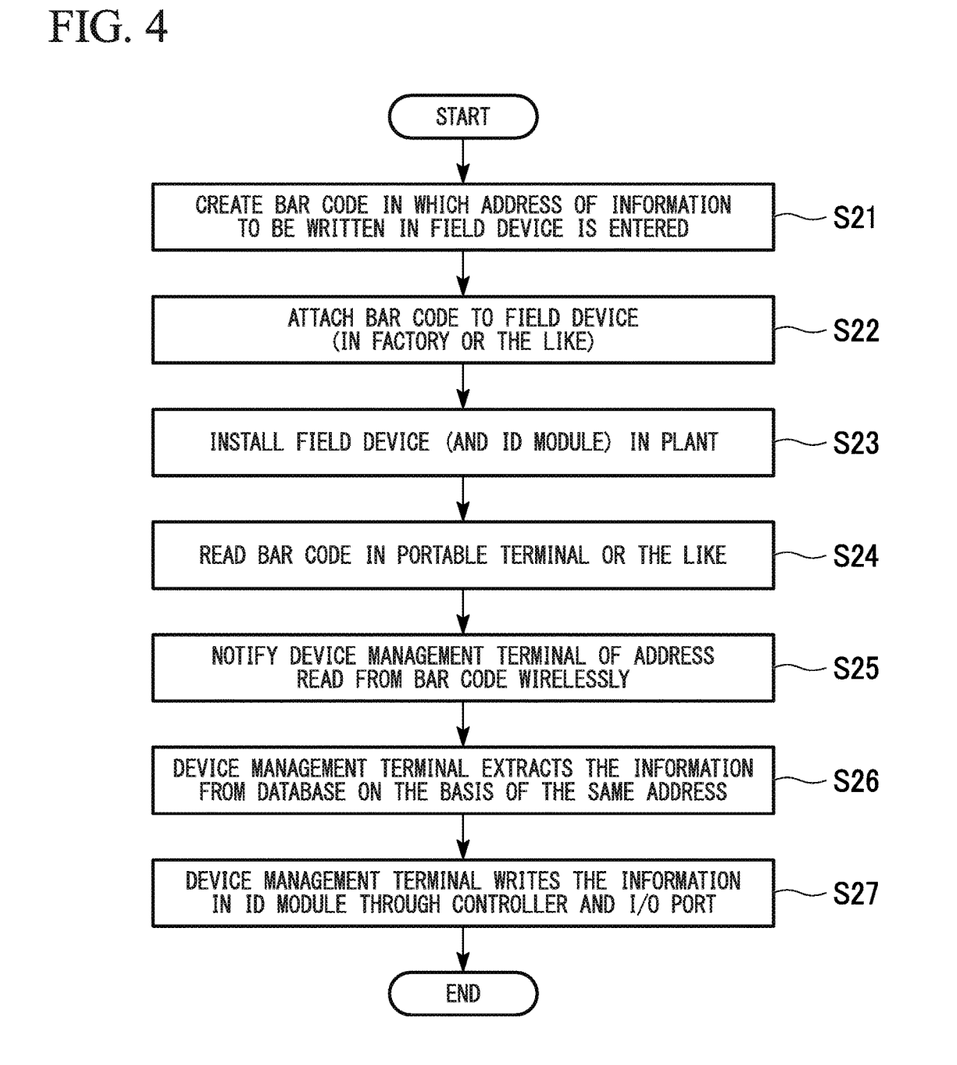
FIG. 4 is a flow diagram showing a flow for determining the type of field device in the process control system according to a modification example of the embodiment of the present invention.

Next, a modification example of the embodiment of the present invention using a bar code will be described. The bar code is, for example, a QR (Registered Trademark) code. In the process control system according to the modification example, a bar code or the like indicating an address of a database having information of the field device 11 is attached to the field device 11 in advance. The portable terminal 17 reads this bar code, and transmits the address of a database to the device management terminal 15. The device management terminal 15 is connected to a database, and acquires information (such as device name, serial number, and tag name) of the field device 11 from the connected database. The device management terminal 15 writes the acquired information of the field device 11 in the memory 25 of the ID module 10.

A description will be given of a flow showing the signal type of the field device in the process control system according to the modification example of the embodiment of the present invention using the bar code. FIG. 4 is a flow diagram showing a flow showing the signal type of the field device in the process control system according to the modification example of the embodiment of the present invention using the bar code.

(Step S21)

First, a bar code indicating the address of the database that stores the information (such as device name, serial number, and tag name) of the field device 11 is created. Examples of the bar code to be used may include a bar code, an RFID and the like which are capable of recording and reproducing address information.

(Step S22)

Next, a bar code is attached to the field device 11, before shipment, in a factory or the like of the field device 11. Meanwhile, a bar code may be attached to the field device 11 installed in a plant.

(Step S23)

The field device 11 and the ID module 10 are installed in a plant.

(Step S24)

The portable terminal 17 or the like reads the bar code.

(Step S25)

The portable terminal 17 or the like reads out the address of the database from the bar code, and transmits the read-out address of the database to the device management terminal 15 wirelessly or the like.

(Step S26)

The device management terminal 15 is connected to a database on the basis of the received address of a database, and acquires information (such as device name, serial number, and tag name) of the field device 11 from the connected database.

(Step S27)

The device management terminal 15 writes the acquired information of the field device 11 in the memory 25 of the ID module 10 through the network N, the controller 13, and the I/O module 12. The processes after that are the same as step S14 and subsequent steps of FIG. 3.

Meanwhile, in the above description, the device management terminal 15 performs steps S25 to S27, but the operation monitoring terminal 14, the controller 13, or the portable terminal 17 may perform steps S25 to S27, instead of the device management terminal 15.

Figure 5:
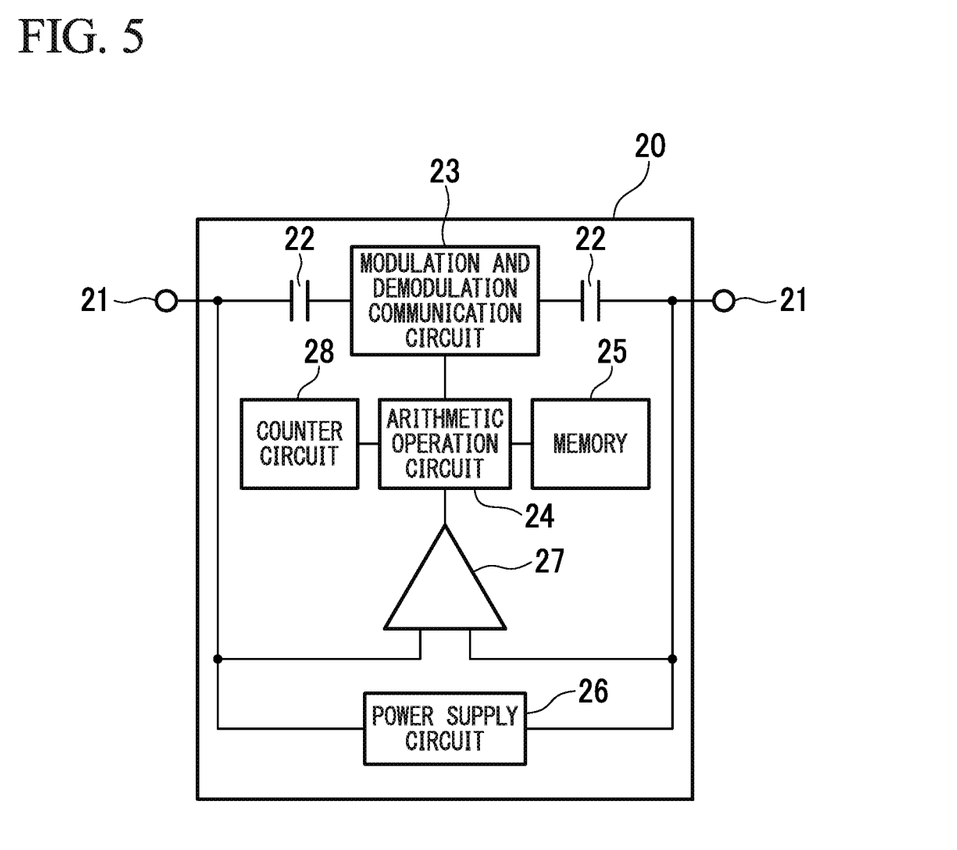
FIG. 5 is a circuit diagram showing a configuration example of the ID module in the process control system according to the embodiment of the present invention.

Another embodiment of the present invention will be described. In the present embodiment, the configuration of an ID module is different from that of the above-described embodiment. FIG. 5 is a circuit diagram showing a configuration example of an ID module in the process control system according to another embodiment of the present invention.

An ID module 20 includes terminal units 21, capacitors 22, a modulation and demodulation communication circuit 23, an arithmetic operation circuit 24, a memory 25, a power supply circuit 26, a voltage detection circuit 27, and a counter circuit 28. That is, the difference between the ID module 10 and the ID module 20 is in that the voltage detection circuit 27 and the counter circuit 28 are provided, and other configurations are the same as those of the ID module 10 and the ID module 20. Therefore, in the following description, the power supply circuit 26 and the voltage detection circuit 27 will be described. Meanwhile, the ID module 20 may not include the counter circuit 28.

The voltage detection circuit 27 is connected to the terminal unit 21 in parallel with the power supply circuit 26, and measures (detects) a voltage between wirings. The voltage (voltage signal) between wirings detected by the voltage detection circuit 27 is converted into modulated and demodulated signals by the modulation and demodulation circuit 23, and is transmitted to the device management terminal 15. Specifically, the modulation and demodulation circuit 23 superimposes a digital signal indicating a detection result of the voltage detection circuit 27 on an analog signal through a wiring to transmit the superimposed signal as a hybrid signal, and the device management terminal 15 reads out the detection result (detected voltage value) of the voltage detection circuit 27 from the hybrid signal.

In a case where the field device 11 is a voltage output device, the device management terminal 15 compares a voltage value which is read by an analog voltage detection circuit of the voltage output device with a voltage value which is measured by the voltage detection circuit 27 of the ID module 20, thereby allowing a deterioration in the analog voltage detection circuit of the voltage output device to be ascertained.

In addition, the voltage detection circuit 27 measures (detects) a supply voltage which is supplied from an instrumentation power supply to the ID module 20. The supply voltage (voltage signal) detected by the voltage detection circuit 27 is converted into modulated and demodulated signals by the modulation and demodulation circuit 23, and is transmitted to the device management terminal 15. Specifically, the modulation and demodulation circuit 23 superimposes a digital signal indicating a detection result of the voltage detection circuit 27 on an analog signal through a wiring to transmit the superimposed signal as a hybrid signal, and the device management terminal 15 reads out the detection result (detected voltage value) of the voltage detection circuit 27 as the hybrid signal. The device management terminal 15 analyzes a change in the voltage value over time, or the like, thereby allowing a deterioration in the instrumentation power supply to be detected.

In a case where the field device 11 outputs (D/O) digital data (digital signal), or inputs (D/I) digital data (digital signal), the counter circuit 28 counts statistical information such as the number of times of ON/OFF of the field device 11 through the voltage detection circuit 27 and the arithmetic operation circuit 24. The statistical information such as the number of times of ON/OFF of the field device 11 counted by the counter circuit 28 is converted into modulated and demodulated signals by the modulation and demodulation circuit 23, and is transmitted to the device management terminal 15. Specifically, the modulation and demodulation circuit 23 superimposes a digital signal indicating a count result of the counter circuit 28 (the number of times of ON/OFF of field device 11) on an analog signal through a wiring to transmit the superimposed signal as a hybrid signal, and the device management terminal 15 reads out the count result of the counter circuit 28 (the number of times of ON/OFF of the field device 11) from the hybrid signal. The device management terminal 15 can determine the maintenance time of the field device 11 on the basis of the number of times of ON/OFF of the field device 11 (that is, the number of times of operation of the field device 11), which leads to possible preventive maintenance.

According to the process control system of the embodiment of the present invention, the efficiency of wiring work in the I/O module is also improved in the process control system including a large number of non-intelligent field devices. In addition, it is possible to perform the diagnosis (disconnection confirmation or the like) of a wiring to which the non-intelligent field device is connected, or the status confirmation (location information, operation history, or the like) of the non-intelligent field device.

According to the process control system of the embodiment of the present invention, even in a case where the field device or the signal type of the field device is unclear in construction work and maintenance work of the process control system (instrumentation system) including the non-intelligent field device, the field device or the signal type of the field device can be determined on the I/O module side after wiring. Therefore, it is possible to perform wiring work regardless of the field device or the signal type of the field device, and to improve the efficiency of work.

According to the process control system of the embodiment of the present invention, it is possible to diagnose (inspect a wiring) the health of a wiring connected to the non-intelligent field device which is not able to be inspected in the related art, and to perform the safe operation of a plant more highly.

According to the process control system of the embodiment of the present invention, the ID module is connected to the non-intelligent field device, and thus the process control system can specify the non-intelligent field device. Using this, it is possible to perform plug and play of the non-intelligent field device, and to shorten a construction period in a plant.

According to the process control system of the embodiment of the present invention, it is possible to perform wiring inspection even when a wiring is not short-circuited or released in the non-intelligent field device. Thereby, it is possible to drastically shorten a period required for checking a total function of a plant called a loop check.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A diagnostic method of diagnosing a field device as to whether the field device is a first field device or a second field device, the first field device being capable of communicating a hybrid signal which is an analog signal having a digital signal superimposed thereon, the second field device being incapable of communicating the hybrid signal comprising:

setting a plurality of connection units included in an I/O module to be in a state of being capable of inputting or outputting the hybrid signal, each of the connection units being connected to the field device and being connected to an ID module that is connected in parallel to the field device and provides at least identification information for identifying at least one of the first field device and the second field device, the connection units being capable of inputting the hybrid signal, outputting the hybrid signal, inputting a digital signal, and outputting a digital signal; and diagnosing the field device which is connected to the connection units of the I/O module, at least as to whether the field device is the first field device or the second field device, based on the identification information included in the digital signal included in the hybrid signal obtained through the connection units; and setting the connection units connected to the field device to be in a state of being capable of any one of inputting the hybrid signal, outputting the hybrid signal, inputting a digital signal, and outputting a digital signal, in accordance with diagnosis results of the field device, wherein the diagnosing of the field device and the setting of the connection units are performed by a controller, which is communicably connected to the I/O module and controls the field device, or a portable terminal which is connected to the I/O module.

2. The diagnostic method according to claim 1, wherein the ID module that provides at least identification information for identifying the second field device is connected in parallel to the second field device.

3. The diagnostic method according to claim 2, further comprising:
writing in a memory of the ID module at least the identification information of the second field device connected to the ID module.

4. The diagnostic method according to claim 2, further comprising:
causing the ID module to update information written in the memory of the ID module.

5. The diagnostic method according to claim 4, further comprising:
acquiring the information written in the memory of the ID module from a database.

* * * * *